(No Model.) 2 Sheets—Sheet 1.

F. C. PETELER.
COMBINATION HOT WATER AND HOT AIR HEATER.

No. 473,475. Patented Apr. 26, 1892.

Witnesses.
C. E. Van Doren
F. S. Lyon

Inventor.
Frank C. Peteler
By Paul & Morrow Attys.

(No Model.) 2 Sheets—Sheet 2.

F. C. PETELER.
COMBINATION HOT WATER AND HOT AIR HEATER.

No. 473,475. Patented Apr. 26, 1892.

Witnesses.
C. E. Van Dorn.
F. A. Lyon.

Inventor.
Frank C. Peteler.
By Paul & Merwin Att'ys.

UNITED STATES PATENT OFFICE.

FRANK C. PETELER, OF MINNEAPOLIS, MINNESOTA.

COMBINATION HOT-WATER AND HOT-AIR HEATER.

SPECIFICATION forming part of Letters Patent No. 473,475, dated April 26, 1892.

Application filed August 4, 1891. Serial No. 401,691. (No model.)

*To all whom it may concern:*

Be it known that I, FRANK C. PETELER, of Minneapolis, in the county of Hennepin and State of Minnesota, have invented certain Improvements in Combination Hot-Water and Hot-Air Heaters, of which the following is a specification.

This invention relates to an improvement in heaters; and the objects I have in view are to provide a small and efficient combination hot-water and hot-air heater; and the invention consists generally in the construction and combination hereinafter described, and particularly pointed out in the claims.

Figure 1:
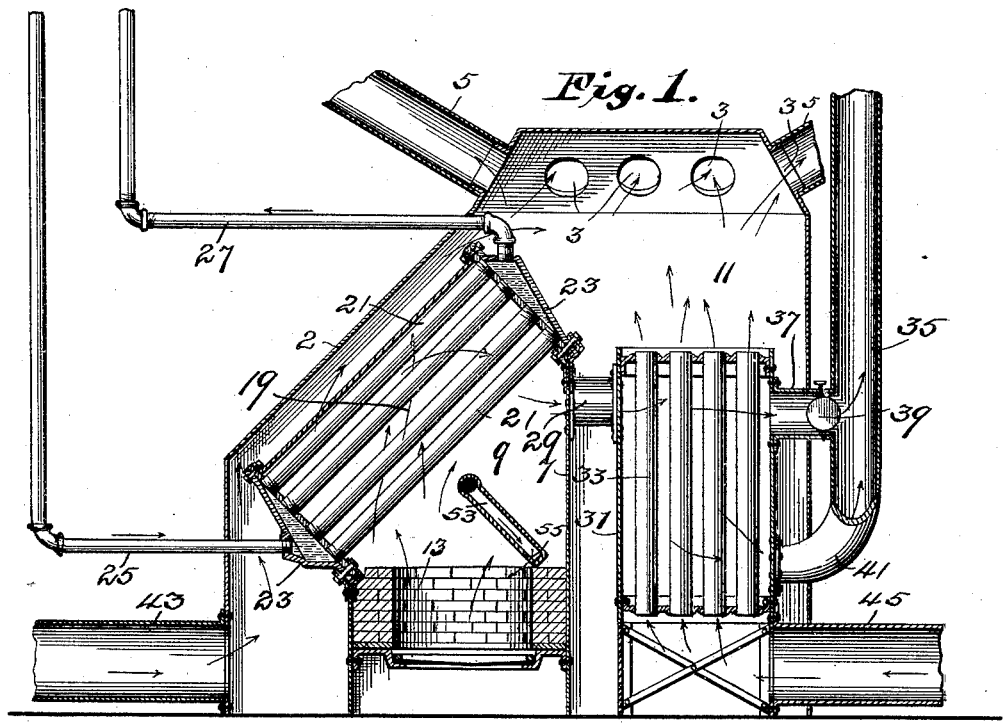
Figure 2:
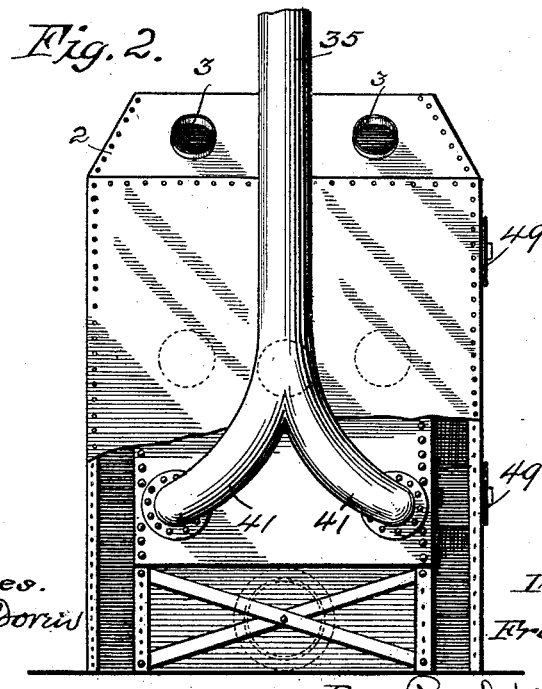
Figure 3:
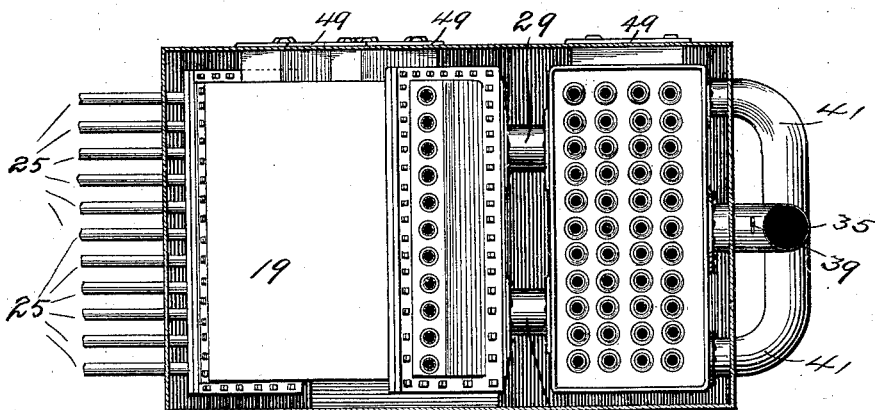
Figure 4:
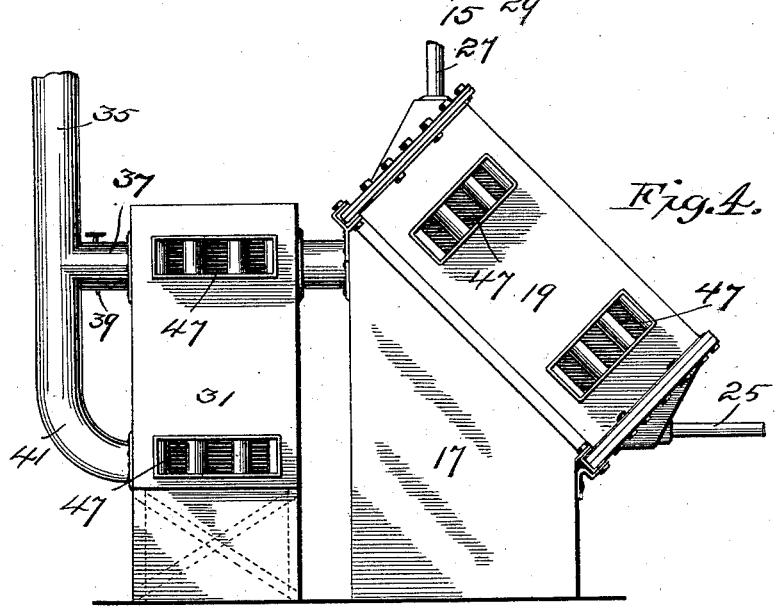

In the accompanying drawings, forming a part of this specification, Figure 1 is a vertical section of a combination hot-water and hot-air heater embodying my invention. Fig. 2 is an end elevation of the same with a portion of the outer wall or casing broken away. Fig. 3 is a plan view with the casing in section. Fig. 4 is a side elevation showing the heater with the casing omitted.

In the drawings, 2 represents the casing of the heater, which may be of any suitable size and construction, and is preferably formed of sheet metal and provided with a series of openings 3, arranged at or near its top, through which the heated air may pass and enter the pipes 5, leading to the apartments to be heated. This casing is divided into two parts by the vertical wall or partition 7, and within one of these parts of the casing is located the fire-pot and over it the water-heating pipes or drum, while the air pipes or drum are located in the other portion of the casing.

I designate the chamber 9, in which the fire-pot is located, as the "combustion-chamber" and the chamber 11 as the "air-heating chamber." The fire-pot 13 is located in the chamber 9, and it may be of any suitable size and construction, and the casing is provided with a suitable fire-door 15, through which fuel may be placed in the fire-pot. The partition 7 forms one wall of this chamber 9, and at the front and back of this chamber are walls 17, that extend parallel to each other and preferably at right angles to the partition 7. Above the fire-pot is arranged the drum 19, having its lower side open and forming the top, and a continuation of the side walls of the chamber 9. A series of pipes 21 pass through the drum 19, being secured in the heads of the drum, as shown in Fig. 1. These pipes preferably extend parallel to the walls of the drum 19 and extend in an inclined direction over the fire-pot 13. The ends of the drum are provided with the heads 23, that inclose the ends of the pipes, thus forming, with the pipes, a water-heater that has its pipes extending through the chamber 9, so that the products of combustion passing from the fire-pot pass up through and around the pipes 21. The heads 23 have connected to them the water-circulating pipes 25 and 27, any number of said pipes being used.

The smoke-pipe 29 is connected to the chamber 9 at the upper part of the partition or wall 7 opposite the pipes 21. This smoke-pipe communicates with the air-heating drum 31, which is provided with a series of vertical pipes 33. The lower head of this drum is at a distance from the bottom or floor of the drum 31, so as to leave a space below the head and below the pipes 33. The drum is connected with the smoke-pipe 35 by means of the pipe 37 at the upper portion of the drum, which has the damper 39, and also by means of the branch pipes 41, that are connected to the lower portion of the drum. The air-pipe 45 extends through the casing below the lower head of the drum 31 and below the pipes 33. A similar pipe 43 is also connected to the casing at a point below the water-heating drum.

I prefer to provide openings 47 in the drums 19 and 31, as shown in Fig. 4. Clean-outs and suitable doors 49 are then provided in the walls of the casing, through which access may be had to the drums through the openings 47. I also prefer to provide above the fire-pot an air supplying and heating chamber 53. This chamber is arranged as a deflector immediately over the fire-pot, so as to direct the products of combustion into the spaces between the tubes 21 of the water-heater. This chamber is provided with a suitable inlet-opening, and it also has a series of holes 55 through its wall at a point directly above and close to the fire-pot, so that the heated air from this chamber passes out and mingles with the products of combustion immediately above the fire-pot, thereby aiding in the combustion of any unconsumed gases that would otherwise pass out from the furnace without being consumed.

When the device is in use, a number of the rooms to be heated will be connected to the heater, so as to be heated by hot water, and the others will be arranged to be heated by hot air. The water-heater, being arranged directly over the fire-pot, will be capable of bringing the water in it very quickly to the proper degree of heat, while the air passing in through the pipe 43 will be heated by passing up through the narrow space between the chamber 9 and drum 19 and the wall of the casing. The air passing through the pipe 45 enters the lower part of the drum 31, and passing up through the pipes 33 is heated by the products of combustion, which enter this drum through the pipe 29 and pass to the pipe 35. The damper 39 being ordinarily closed, the products of combustion must pass down through the lower part of the drum 31 before they can escape into the smoke-pipe.

I claim as my invention—

1. The combination, in a heater, with the casing, of the chamber 9, the fire-pot arranged therein, the series of inclined pipes extending through said chamber, the smoke-pipe 29, arranged opposite said pipes, and the deflecting and air-heating chamber 53, arranged above said fire-pot, so as to deflect the products of combustion and cause them to pass among said pipes 21, substantially as described.

2. The combination, in a heater, of two smoke and combustion chambers, with a fire-pot arranged in one of said chambers, upright flues 33, provided in the other, the duct 29 between said chambers, the water-heating devices arranged in the fire-pot chamber, an inclosed case for the whole, air-ducts for supplying air to the bottom thereof, the smoke-pipe 35, the direct draft connection 37, extending through between the upper parts of the chamber containing the tubes or flues 33 and the said smoke-pipe, a damper arranged therein, said chamber or drum provided with openings at its lower corners, the combined area of said openings equaling the area of said smoke-pipe, and pipes 41, connecting the same with the lower end of said smoke-pipe, whereby an equal distribution of the smoke into all parts of the heating chamber or drum is accomplished, substantially as described.

3. The combination, with the fire-pot and grate, of the walls 7 and 17 to inclose the same, said walls made of sheet metal, a water-heating device arranged slantingly above the fire-pot and made up of heavy tubes 21, having their ends secured in the heavy flue-plates, the inclosing water-tight heads 23, forming with said flue-plates chambers at the ends of said flues or tubes, bolts for securing said parts together, flanges arranged on the sheet-metal walls and whereto said parts are secured, said head 23 having angular portions wherein the ends of the water-heating pipes 25 and 27 are arranged, the inclosing case for the whole, an air-duct leading into the bottom thereof, and hot-air pipes leading from the top of said case, substantially as described.

4. The combination, in a heater, of the walls 7 and 17, the fire-pot inclosed thereby, the heads 23, flue-plates making water-tight joints therewith and forming therewith water-chambers, water tubes or flues extending between the same and slantingly above said fire-pot, water-heating pipes leading from said heads, flanges on the sheet-metal walls 7 and 17 to support said heads, the same being bolted thereto, a drum 31, having upper and lower flue-plates, the tubes 33, secured therein and having ends opening through the same, the cool-air chamber arranged in the lower part of the drum and the upper part being open, and pipes 29, connecting the combustion-chamber beneath the water-pipes with said drum, a smoke-pipe 32, pipes branching from the bottom of the drum thereto, a sheet-metal case surrounding the whole and conforming to the shape thereof, an air-duct connected therewith, a cap therefor provided with hot-air openings, and pipes 5 to carry the heated air therefrom, substantially as described.

5. The combination, with the sheet-metal walls 7 and 17, of the fire-pot, the slanting water-tubes arranged in an inclosing chamber above the same, a drum 31, vertical flues or pipes 33, extending between the heads thereof, pipes 29, connecting the combustion-chamber with the drum, smoke-pipes leading therefrom, a case conforming to the shape thereof having the slanting wall 2 and clean-out openings, and sleeves 47, extending from the walls of the chambers containing the water and air pipes and extending through the rear of said case and removable caps 49 therefor, substantially as described.

In testimony whereof I have hereunto set my hand this 27th day of July, 1891.

FRANK C. PETELER.

In presence of—
A. C. PAUL,
FRED. S. LYON.